United States Patent Office 2,983,761
Patented May 9, 1961

2,983,761

PRODUCTION OF LIQUID ALKYLATED PENTABORANE

Herbert Landesman, Covina, Calif., assignor to Olin Mathieson Chemical Corporation, a corporation of Virginia No Drawing. Filed July 15, 1957, Ser. No. 672,099

8 Claims. (Cl. 260—606.5)

This invention relates to a method for the manufacture of liquid alkylated pentaboranes. Such materials are useful as fuels, particularly fuels for gas turbines, when burned with air, as described in Altwicker, Garrett, Weilmuenster and Harris application Serial No. 497,408, filed March 28, 1955.

In accordance with the present invention, it has been discovered that pentaborane-9 and lower alkyl ethers can be reacted in admixture with an alkylation catalyst to form liquid alkylated pentaboranes. The lower alkyl ethers which can be used are those which contain from 1 to 4 carbon atoms in each alkyl radical, among them being methyl ether, ethyl ether, n-propyl ether, isopropyl ether, n-butyl ether, methyl ethyl ether, methyl n-propyl ether and the like. A wide variety of alkylation catalysts can be employed for the purpose of promoting the reaction between the pentaborane-9 and the alkyl ether, for example, aluminum chloride, aluminum bromide, ferric chloride, ferric bromide and so forth. Preferably, the quantity of alkyl ether will be within the range from about 0.3 to 4.0 moles of alkyl ether per mole of pentaborane-9 and the quantity of catalyst used will be within the range from about 0.5 to 8.0 moles of catalyst per mole of pentaborane-9. The reaction can be carried out at a temperature between 0° C. and 100° C., the preferred operating temperature being between 30° C. and 85° C. Depending uopn the temperature employed, the reaction time can be varied widely, from about 0.5 to 10 hours being suitable.

The alkyl pentaboranes produced by carrying out the reaction can be separated from the reaction mixture by using conventional fractionation, preferably vacuum fractionation.

The following examples illustrate various embodiments falling within the scope of this invention.

Example I

To a 50 cc. glass tube equipped with a break-off there was added 3 grams of aluminum chloride and 0.5 cc. (0.35 gram) of isopropyl ether. The tube was then evacuated while being cooled in a —196° C. bath. Then 0.8 cc. (0.48 gram) of pentaborane-9 was condensed into the tube, which was then sealed off and then warmed to 0° C. by means of an ice bath. The tube was then heated at 60° C. for 3 hours in a water bath. Following this, the tube was cooled to —196° C. by immersion in a bath containing liquid nitrogen, after which it was attached to a vacuum line and opened to the line. A total of 9 cc. of hydrogen was removed from the reactor tube and measured in a calibrated system. The volatile fraction from the reaction tube was then removed by allowing the reaction flask to gradually warm up to room temperature. Fractionation of the volatile fraction was accomplished by passing the volatile material through a series of cold traps maintained at —10° C., —45° C. and —80° C. The fraction retained in each separate bath was allowed to warm up and transferred to a graduated tube, the volume measured and a sample taken for analysis. It was shown by analysis that the material trapped at —10° C. was 50 percent monopropylpentaborane-9 and 50 percent pentaborane-9. The volume of this fraction was 0.27 cc. The material trapped in the —45° C. trap (0.33 cc.) was shown by analysis to be 75 percent pentaborane-9 and 25 percent monopropylpentaborane-9. No volatile material was retained in the trap held at —80° C. During these fractionation operations a total of 0.23 gram (0.38 cc.) of pentaborane-9 was recovered as unreacted material. If desired, the monopropylpentaborane-9 and pentaborane-9 can be separated from each other by additional fractionation.

Example II

To a 50 cc. glass tube equipped with a break-off there was added 0.7 gram (1.0 cc.) of isopropylether and 4 grams of aluminum chloride. Then 0.3 gram of pentaborane-9 (0.5 cc.) was condensed into the tube which was then sealed off and warmed to 0° C. by means of an ice bath. The tube was heated at 60° C. for 3 hours, cooled to liquid nitrogen temperature and then sealed to a vacuum line. In the next step, the tube was opened to the vacuum system and the hydrogen contained in the reaction tube was pumped off and measured in a calibrated section. A total of 50 cc. of hydrogen was obtained. The tube and contents were then allowed to warm up to room temperature and the volatile materials fractionated through a series of baths maintained at —10° C., —45° C. and —80° C. The fractions obtained in each cold bath were transferred to a calibrated tube, the volume measured and samples taken for analysis. From the trap maintained at —80° C. there was obtained 0.77 cc. of gas which consisted of 20 percent pentaborane-9 and 80 percent hydrogen chloride. From the trap maintained at —45° C. there was obtained 0.13 cc. of gas which consisted of 10 percent monopropylpentaborane-9, 45 percent pentaborane-9 and 45 percent propane. The —10° C. fraction had a volume of 0.18 cc. and consisted of 90 percent monopropylpentaborane-9 and 10 percent pentaborane-9. The total quantity of pentaborane-9 recovered was 0.14 gram (0.23 cc.). Based on the amount of pentaborane-9 used in the reaction, the yield of monopropylpentaborane-9 was 0.102 gram or 38 percent (0.7 cc.).

What is claimed is:

1. A method for the production of a liquid alkylated pentaborane which comprises reacting pentaborane-9 and from about 0.3 to about 4.0 moles per mole of pentaborane-9 of a lower alkyl ether containing from 1 to 4 carbon atoms in each alkyl radical at a temperature within the range from about 0° C. to about 100° C. while the reaction mixture contains from about 0.5 to 8 moles per mole of pentaborane-9 of an alkylation catalyst selected from the group consisting of aluminum chloride, aluminum bromide, ferric chloride and ferric bromide, and recovering a liquid alkylated pentaborane from the reaction mixture.

2. The method of claim 1 wherein said ether is isopropyl ether.

3. The method of claim 1 wherein said alkylation catalyst is aluminum chloride.

4. The method of claim 1 wherein said alkylation catalyst is aluminum bromide.

5. The method of claim 1 wherein said alkylation catalyst is ferric chloride.

6. The method of claim 1 wherein said ether is isopropyl ether and wherein said alkylation catalyst is aluminum chloride.

7. The method of claim 1 wherein said ether is isopropyl ether and wherein said alkylation catalyst is aluminum bromide.

8. The method of claim 1 wherein said ether is isopropyl ether and wherein said alkylation catalyst is ferric chloride.

No references cited.